United States Patent [19]

Osawa

[11] Patent Number: 4,798,732
[45] Date of Patent: Jan. 17, 1989

[54] METHOD OF STABILIZING COFFEE EXTRACT SOLUTION

[75] Inventor: Hide Osawa, Tokyo, Japan

[73] Assignee: Ajinomoto General Foods, Inc., Tokyo, Japan

[21] Appl. No.: 119,945

[22] Filed: Nov. 12, 1987

[51] Int. Cl.⁴ .............................................. A23F 5/24
[52] U.S. Cl. ..................................... 426/542; 426/594
[58] Field of Search .......................................... 426/542

[56] References Cited

U.S. PATENT DOCUMENTS 3,997,685 12/1976 Strobel ............................ 426/650 X
4,279,937 7/1981 Strobel et al. ................... 426/428 X

FOREIGN PATENT DOCUMENTS 741806 5/1970 Belgium .............................. 426/542
6138347 8/1983 Japan ................................. 426/542
0051763 3/1984 Japan ................................. 426/542

OTHER PUBLICATIONS

JPOABS (Japanese Patent Abstracts) Abstracting 57-208948, Dec. 22, 1982, Preparation of Additive for Instant Coffee, Kaoru Inagami et al.

Primary Examiner—Joseph Golian
Attorney, Agent, or Firm—Linn I. Grim; Daniel J. Donovan

[57] ABSTRACT

A method of stablizing coffee extract solution is described by adding to the coffee extract solution a water extract from powdered raw coffee beans.

4 Claims, No Drawings

METHOD OF STABILIZING COFFEE EXTRACT SOLUTION

DESCRIPTION OF THE INVENTION

The present invention relates to a method of stabilizing a coffee extract solution. More particularly, the present invention pertains to a method of stabilizing a coffee extract solution or a concentrated coffee extract solution by adding an extract from frozen and finely powdered raw coffee beans to the coffee extract solution.

BACKGROUND ART

Coffee extract solutions are used to produce instant coffee powders or concentrated coffee extract solutions which are obtained by concentrating coffee extract solutions. However, it is known that coffee extract solutions are extremely unstable and, in particular, contact of a coffee extract solution with oxygen causes the components of coffee in the solution to be oxidized in a short period of time, resulting in the flavor and fragrance of the coffee being considerably degraded. In order to prevent degradation of the flavor and fragrance of coffee extract solutions, various methods have already been proposed, for example, a method in which a large amount of sugar, e.g., sucrose or glucose, is added to a coffee extract solution, and another method in which a small amount of ascorbic acid (vitamin C), which is an anti-oxidizing agent used as a food additive, is added to a coffee extract solution. However, the method in which sugar is added causes the coffee extract solution to become excessively sweet or undesirably makes the solution into a high-calorie product. In regard to the method that utilizes vitamin C, it is reported that the coexistence of a coffee extract and ascorbic acid causes Chinese hamster cells to show mutagenicity which is four or more times as high as that in the case of a coffee extract solution alone. Therefore, coffee products obtained by this method give people an unfavorable impression.

According to still another proposed method, liquefied carbon dioxide gas or dry ice is added in a container filled with a coffee extract solution to replace the head space in the container with a carbon dioxide atmosphere, thus stabilizing the coffee extract solution. However, it is known that, since oxygen has already been dissolved in the coffee extract solution, autoxidation of the coffee extract solution cannot be prevented simply by blowing carbon dioxide gas into the head space, and the solution is thus oxidized add degraded with time.

Although attempts have been made to add sugars, vitamin C and the like to coffee extract solutions or concentrated coffee extract solutions for the purpose of stabilizing the quality of such solutions as described above, no satisfactorily results have yet been obtained. Further, the proposed method in which a coffee extract solution or a concentrated coffee extract solution is filled in a hermetically sealed container and the head space in the container is replaced with an atmosphere of an inert gas such as carbon dioxide gas is still incapable of satisfactory preventing degradation of the quality of the stored solution.

DISCLOSURE OF THE INVENTION

The present inventors have succeeded in improving the stability of a coffee extract solution or a concentrated coffee extract solution without degrading the quality of coffee by adding a substance derived from coffee beans, which is a natural anti-oxiding agent and is extracted from raw coffee beans, to the coffee extract solution.

The anti-oxidizing substance according to the present invention which is extracted from raw coffee beans can be prepared by finely powdering raw coffee beans before or after defatting them and then carrying out extraction with hot water.

Raw coffee beans are defatted by a conventional method. More specifically, fat components in raw coffee beans are removed by extraction with an organic solvent such as hexane or petroleum ether. In order to increase the extraction efficiency and facilitate the fine grinding that is carried out later, it is preferable to conduct coarse grinding before the extraction. In particular, if jet milling is performed, it is general practice to carry out coarse grinding. Although coarse grinding may be effected by conventional method, it is preferable, in order to stabilize each component in the raw coffee beans and increase the grinding efficiency, to subject the raw coffee beans to quick freezing and then grind them into a powder having a particle size of about 8 to 60 mesh by means of a coffee grinder or an impact grinder.

The coarsely ground raw coffee beans are defatted by extraction with an organic solvent. Generally, the extraction is conveniently carried out at room temperature, but it may also be effected at raised or lowered temperatures. Under conditions where the raw coffee beans are left at rest at room temperature, defatting can be completed in about 0.2 to 2.0 hours. If desired, the extraction may be repeated twice or more to completely defat the raw coffee beans.

After the defatting process the organic solvent is removed from the coarsely ground raw coffee beans by filtration and/or air-drying.

Thereafter, the raw coffee beans are finely powdered by jet mill grinding or freeze fine grinding so that the average particle diameter is 100 m or less, preferably 40 m or less. It is preferable to carry out freeze fine grinding from the viewpoint of simplification of the process and enhancement of the extraction efficiency. It is also possible to finely powder the raw coffee beans so that the average particle diameter is 100 m or less without coarsely grinding them, and then carry out the defatting treatment.

The raw coffee beans which have been coarsely ground, defatted and finely powdered, or the raw coffee beans which have been finely powdered and defatted, are then subjected to extraction with hot water. The finely ground coffee powder is mixed with hot water which is, for example, 5 to 30 times the weight of the former, and the mixture is boiled for about 5 to 30 minutes, preferably about 10 to 20 minutes, to extract an anti-oxidizing substance with hot water.

After the extraction, the finely ground raw coffee powder is removed by, for example, filtration, and the filtrate is concentrated and/or air-dried so as to be used as an anti-oxidizing agent.

It has been found that the anti-oxidizing agent used in the present invention has a strong anti-oxidizing power than that of an extract from raw coffee beans which is obtained by the conventional enzymatic process and, in addition, the process for producing the agent according to the present invention is relatively simple and the process efficiency favorably high.

The anti-oxidizing agent according to the present invention, which is prepared from raw coffee beans, is added to a coffee extract solution or a concentrated coffee extract solution in such an amount that the extract from raw coffee beans is 0.005 to 20 wt%, preferably 0.15 to 5 wt%, with respect to the solid content of coffee. Since the anti-oxidizing agent of the present invention is a substance derived from raw coffee beans, addition of the agent involves no fear of the coffee suffering from substantial changes in its characteristic flavor and fragrance, and the agent can safely be used as a food additive, so that it is possible to determine the amount in which the agent is to be used as desired. Further, it has been confirmed that the method according to the present invention enables the coffee extract solution to display anti-oxidizing properties for a long period of time and an excellent stabilizing effect is thus obtained.

The present invention will be described hereinunder in more detail by way of Examples.

EXAMPLE I (1) Extraction of a natural anti-oxidizing substance

Raw coffee beans were frozen by the use of liquid nitrogen and ground to obtain a powder having an average particle size of about 20 to 30 microns. Then, 20 g of this powder was boiled in 100 cc of water for 15 minutes with additional water occasionally added so that the amount of water was maintained at 100 cc. The mixture was then filtered to remove the solid content, and water was added to the filtrate so that the total amount was adjusted to 100 cc.

(2) Addition of the anti-oxidizing agent to a concentrated coffee extract solution Twenty cubic centimeters of the extract solution obtained in (1) was added to and mixed with 100 g of concentrated coffee extract solution (34.5 a).

(3) Effect

A comparative experiment was carried out to examine the stabilizing effect of the anti-oxidizing substance on coffee.

Twenty cubic centimeters of the above-described extract solution was added to 100 g of concentrated coffee extract solution (34.5 a) and thoroughly stirred. The mixture was then put in a stoppered test tube. Samples which were similarly prepared were put in similar test tubes and stored for two weeks at three different temperatures, that is, 20° C., 5° C. and 32° C., with three samples for each of the three temperatures.

In place of the above-described extract solution, 20 cc of water was added to 100g of concentrated coffee extract solution (34.5%) to prepare controls, which were stored under the same conditions.

For each of the samples and the controls, the titratable acidity (cc/100g) with respect to 100g of concentrated coffee extract solution was measured by titration using 1 N NaOH aqueous solution at the following three different times, that is, at the start of the storage period and after one week and two weeks had elapsed thereafter.

The results are shown in Table 1 below. It should be noted that acidity in Table 1 shows the degree to which each of the tested coffee extract solutions had been oxidized.

TABLE 1

| Storage Conditions | Change of Titratable Acidity with Time | | | | |
|---|---|---|---|---|---|
| | At the Start of Storage | After 1 Week of Storage | | After 2 Weeks of Storage | |
| | | Samples | Controls | Samples | Controls |
| 32° C. | 20.0 | 23.8 | 24.7 | 25.6 | 26.4 |
| 5° C. | 20.0 | 21.9 | 24.2 | 22.5 | 24.9 |
| −20° C. | 20.0 | 20.0 | 20.5 | 20.0 | 21.5 |

Table 2 shows the increase in titratable acidity of the samples compared with that of the controls after they had been stored for one week and for two weeks.

TABLE 2

| | Titratable Acidity Increase Ratio | |
|---|---|---|
| | Titratable Acidity Increase Ratio (Sample/Control) | |
| Storage Conditions | After 1 Week of Storage | After 2 Weeks of Storage |
| 32° C. | 81% | 88% |
| 5° C. | 45% | 51% |
| −20° C. | 0% | 0% |

As will be understood from Tables 1 and 2, the anti-oxidizing agent obtained by the method of the present invention has a stabilizing effect on coffee extract solutions stored at 5° C. or lower. However, when the solutions were stored at 32° C., the increase in titratable acidity of the samples was 81% and 88% of the increase in the case of the controls (measured after they had been stored for one week and for two weeks, respectively), and no striking difference was found therebetween.

EXAMPLE II (1) Thirty cubic centimeters of an extract from raw coffee beans extracted by a method similar to (1) in Example 1 was added to and mixed with 100 g of concentrated coffee extract solution (34.5%).

(2) Effect:

In order to examine the effect of the anti-oxidizing substance on the flavor of coffee, an organoleptic test was carried out to make a comparison between samples prepared as described in (1) and control coffee extract solutions mixed with no raw coffee bean extract.

The samples and the control coffee extract solutions were stored under three different conditions, that is, a freezing condition (−18° to −20° C.), a refrigerated condition (0° to −5° C.) and a room temperature condition (20° C.), in order to examine changes of flavor with time. The results are shown in Tables 3 to 5.

TABLE 3

| | Changes of Flavor with Time (under freezing condition) | | | | | | | |
|---|---|---|---|---|---|---|---|---|
| | Storage time | | | | | | | |
| Testing items | 9 days | | 15 days | | 18 days | | 60 days | |
| | Sample | Control | Sample | Control | Sample | Control | Sample | Control |
| Intensity of | No change | No change | No change | Slightly weak | No change | A little weak | No change | Weak |

TABLE 3-continued

Changes of Flavor with Time (under freezing condition)

| Testing items | Storage time | | | | | | | |
|---|---|---|---|---|---|---|---|---|
| | 9 days | | 15 days | | 18 days | | 60 days | |
| | Sample | Control | Sample | Control | Sample | Control | Sample | Control |
| fragrance | | | | | | | | |
| Quality of fragrance | No change | No change | No change | Slightly changed | No change | A little weak | No change | Weak |
| Bitterness | No change | No change | No change | No change | No change | No change | No change | No change |
| Astringency | No change | No change | No change | No change | No change | No change | No change | No change |
| Acidity | No change | No change | No change | No change | No change | No change | No change | Somewhat increased |
| Overall flavor | No change | No change | No change | Slightly changed | No change | No change | No change | Changed |

TABLE 4

Changes of Flavor with Time (under refrigerated condition)

| Testing items | Storage time | | | | | | | |
|---|---|---|---|---|---|---|---|---|
| | 3 days | | 9 days | | 15 days | | 25 days | |
| | Sample | Control | Sample | Control | Sample | Control | Sample | Control |
| Intensity of fragrance | No change | No change | No change | Weak | No change | Weak | No change | Weak |
| Quality of fragrance | No change | No change | No change | Slightly changed | No change | Somewhat changed | No change | Somewhat changed |
| Bitterness | No change | No change | No change | A little changed | No change | Somewhat changed | No change | Somewhat changed |
| Astringency | No change | No change | No change | A little changed | No change | Somewhat changed | No change | Somewhat changed |
| Acidity | No change | No change | No change | Slightly increased | No change | Somewhat increased | No change | Somewhat increased |
| Overall flavor | No change | No change | No change | Slightly changed | No change | A little changed | No change | Changed |

TABLE 5

Changes of Flavor with Time (under room temperature condition)

| Testing items | Storage time | | | | | | | |
|---|---|---|---|---|---|---|---|---|
| | 1 days | | 3 days | | 6 days | | 15 days | |
| | Sample | Control | Sample | Control | Sample | Control | Sample | Control |
| Intensity of fragrance | No change | No change | No change | No change | No change | Weak | No change | Weak |
| Quality of fragrance | No change | No change | No change | Slightly changed | No change | A little changed | No change | Changed |
| Bitterness | No change | No change | No change | No change | No change | No change | No change | No change |
| Astringency | No change | No change | No change | No change | No change | No change | No change | No change |
| Acidity | No change | No change | No change | No change | No change | Somewhat increased | No change | Increased |
| Overall flavor | No change | No change | No change | Slightly changed | No change | A little changed | No change | Changed |

What is claimed is:

1. A method of stabilizing a coffee extraction solution or a concentrated coffee extract solution which comprises adding to said concentrated and/or coffee extract solution, 0.005 to 20 weight percent of said solids content of said coffee extract solution in an anti-oxidizing substance obtained by extraction for about 5 to 30 minutes of an organic solvent defatted powdered raw coffee beans having an average particle diameter of 100 microns or less with a solvent consisting of hot water, the amount of hot water being five to thirty times by weight of the organic solvent defatted powdered raw coffee beans.

2. The method of claim 1 wherein the anti-oxidizing substance is present in said concentrated and/or coffee extract solution in amounts of 0.15 to 5 weight percent of the solid content of said coffee extract solution.

3. The method of claim 1 wherein the finely ground powdered defatted raw coffee beans have an average particle size up to and including 40 microns.

4. The method of claim 1 wherein the finely ground powdered defatted raw coffee beans have an average particle size from 20 to 30 microns.

* * * * *

UNITED STATES PATENT AND TRADEMARK OFFICE
CERTIFICATE OF CORRECTION

PATENT NO. : 4,798,732
DATED : 1/17/89
INVENTOR(S) : Hide Osawa

It is certified that error appears in the above-identified patent and that said Letters Patent is hereby corrected as shown below:

Title page, Col. 1, after "Filed  Nov. 12, 1987" please insert
--Foreign Application Priority Date
    November 21, 1986 [JP]  Japan.......278150/86--

Signed and Sealed this

Thirteenth Day of June, 1989

Attest:

DONALD J. QUIGG

Attesting Officer

Commissioner of Patents and Trademarks